US007664655B2

(12) United States Patent
Rosenthal et al.

(10) Patent No.: US 7,664,655 B2
(45) Date of Patent: Feb. 16, 2010

(54) ELECTRONIC SERVICE OF PROCESS SYSTEM AND METHOD FOR CARRYING OUT SERVICE OF COURT PAPERS

(76) Inventors: Allen Rosenthal, 4099 Cinnamon Way, Weston, FL (US) 33331; Dorothy Caplan, 4099 Cinnamon Way, Weston, FL (US) 33331

( * ) Notice: Subject to any disclaimer, the term of this patent is extended or adjusted under 35 U.S.C. 154(b) by 0 days.

(21) Appl. No.: 11/651,202

(22) Filed: Jan. 8, 2007

(65) Prior Publication Data

US 2007/0112584 A1    May 17, 2007

Related U.S. Application Data

(63) Continuation of application No. 10/000,833, filed on Oct. 31, 2001, now Pat. No. 7,162,428.

(51) Int. Cl.
*G06Q 99/00* (2006.01)
(52) U.S. Cl. .......................................................... 705/1
(58) Field of Classification Search .................. 705/1, 705/7, 8, 9, 11, 39, 40, 26, 27, 500; 707/104.1, 707/10; 709/217, 218, 219
See application file for complete search history.

(56) References Cited

U.S. PATENT DOCUMENTS

| 6,021,202 | A  | 2/2000  | Anderson et al.   |
| 6,072,862 | A  | 6/2000  | Srinivasan        |
| 6,094,655 | A  | 7/2000  | Rogers et al.     |
| 6,233,571 | B1 | 5/2001  | Egger et al.      |
| 6,289,460 | B1 | 9/2001  | Hajmiragha        |
| 6,327,584 | B1 | 12/2001 | Xian et al.       |
| 6,366,925 | B1 | 4/2002  | Meltzer et al.    |
| 6,430,581 | B1 | 8/2002  | Mahoney et al.    |
| 6,501,763 | B1 | 12/2002 | Bhagavath et al.  |
| 6,587,831 | B1 | 7/2003  | O'Brien           |
| 6,611,687 | B1 | 8/2003  | Clark et al.      |
| 6,622,128 | B1 | 9/2003  | Bedell et al.     |

(Continued)

FOREIGN PATENT DOCUMENTS

JP        2001-142986        5/2001

(Continued)

OTHER PUBLICATIONS

New York Professional Process Servers Association; Internet printout; May 8, 1999.

(Continued)

*Primary Examiner*—Igor N Borissov
(74) *Attorney, Agent, or Firm*—Steven M. Jensen; Edwards Angell Palmer & Dodge LLP

(57) ABSTRACT

A system and method for online creation and integration of service of process functions is provided, for use in conjunction with paper or electronic filing of court papers. By logging on to a web page, the user can access a rules and decision matrix database providing the rules and requirements for process service by jurisdiction and type. Such rules can be incorporated into process requests using online tools and document management software. Once entered, the requests are compiled in a database, and a system controller coordinates with affiliated process servers to procure process service in the desired jurisdiction.

18 Claims, 12 Drawing Sheets

U.S. PATENT DOCUMENTS

| | | |
|---|---|---|
| 6,671,805 B1 | 12/2003 | Brown et al. |
| 6,694,315 B1 * | 2/2004 | Grow .......................... 707/10 |
| 6,766,307 B1 | 7/2004 | Israel et al. |
| 6,898,574 B1 | 5/2005 | Regan |
| 6,981,216 B1 * | 12/2005 | Brandes ..................... 715/234 |
| 7,035,830 B1 * | 4/2006 | Shaikh ........................ 705/52 |
| 2002/0002563 A1 * | 1/2002 | Bendik ....................... 707/500 |
| 2002/0029194 A1 | 3/2002 | Lewis et al. |
| 2003/0009345 A1 | 1/2003 | Thorpe |
| 2003/0014295 A1 | 1/2003 | Brookes et al. |
| 2005/0086187 A1 | 4/2005 | Grosser et al. |
| 2006/0271554 A1 * | 11/2006 | Shaikh ........................ 707/10 |

FOREIGN PATENT DOCUMENTS

WO  WO-03/032112  4/2003

OTHER PUBLICATIONS

International Process Servers Assoication; Internet print-out; Dec. 4, 2000.

UCLA Policy 120:Legal Processes-Summonses, Complaints and Subpoenas; Apr. 23, 1999.

Greegard; New Technology is HR's Route to Reengineering;Dialog; File 15; 00883983/9; Jul. 1994.

* cited by examiner

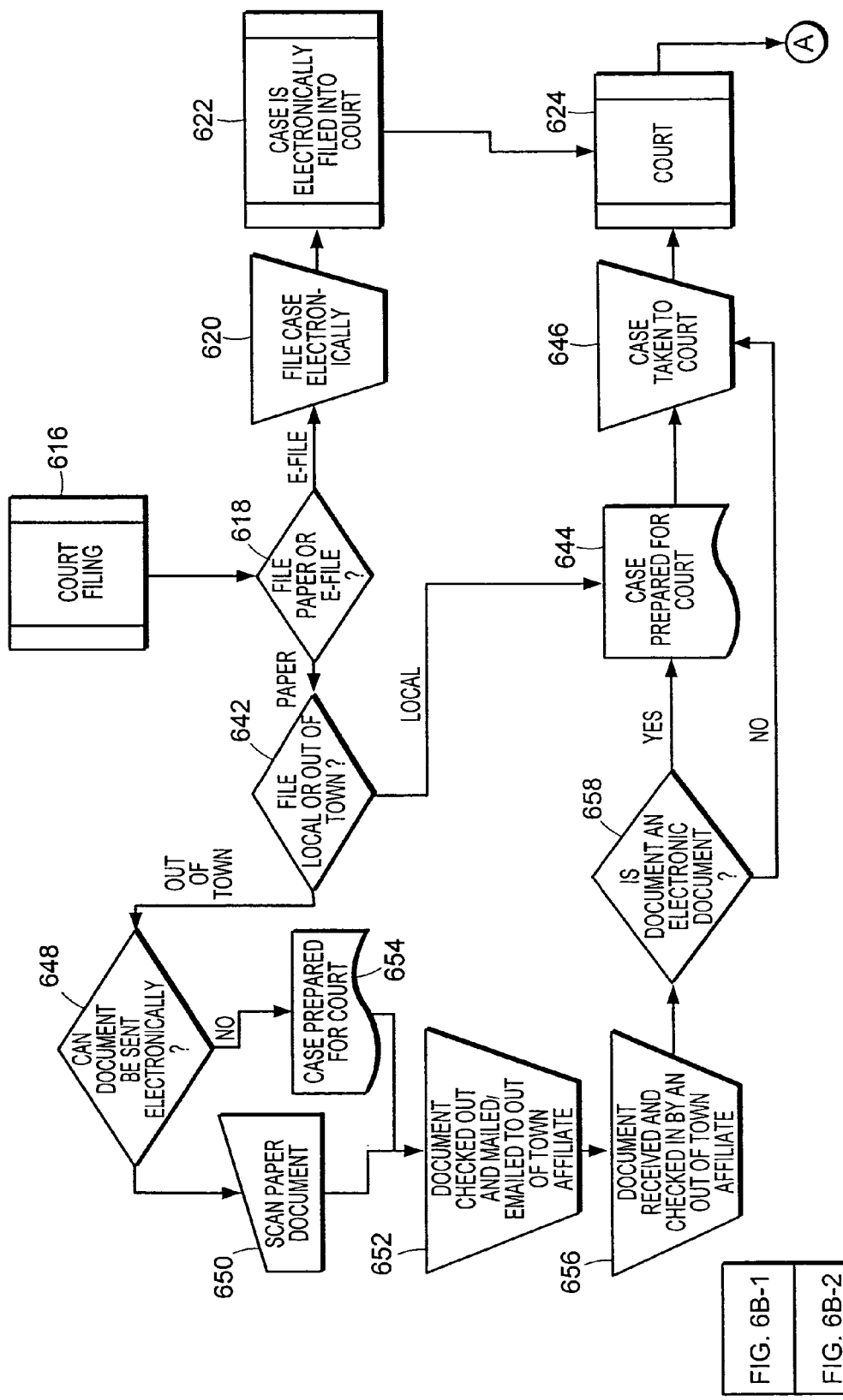

FIG. 8

ELECTRONIC SERVICE OF PROCESS SYSTEM AND METHOD FOR CARRYING OUT SERVICE OF COURT PAPERS

CROSS-REFERENCE TO RELATED APPLICATION(S)

This application is a continuation of copending application U.S. Ser. No. 10/000,833, filed on Oct. 31, 2001, which claims a right of priority to provisional application Ser. No. 60/244,196 entitled "e-Process System and Method," which was filed in the U.S. Patent & Trademark Office on Oct. 31, 2000; and application Ser. No. 60/244,652 entitled "c-Process System and Method," which was filed in the U.S. Patent & Trademark Office on Nov. 1, 2000.

FIELD OF INVENTION

The present invention is directed to a national online system and method for handling service of legal process papers in conjunction with electronic and paper court filings, and more particularly relates to an operational framework including hardware and software that is capable of receiving user instructions to serve process papers in a particular jurisdiction and for procuring actual service of those process papers.

BACKGROUND OF THE INVENTION

Current (or traditional) legal process service is basically a manual labor-intensive operation based upon service of paper, where the method of service has remained largely unchanged for many years. When lawyers or parties initiate litigation, they generate a series of papers, take the papers to the appropriate courthouse, and file the papers with the court clerk. Once officially received and docketed, the papers are then physically delivered or "served" on any person or corporation named as a defendant or respondent in the legal action. This service is accomplished in accordance with extensive rules and rocedures governing matters of how and who can serve process by mail, courier delivery, telecopy, or through a face-to-face presentation by a process server. In the case of corporations, enforceable legal documents, notices, garnishments, and writs are normally served on persons such as registered corporate agents. Process servers, marshals, constables, and sheriffs also serve subpoenas on witnesses, some of whom are not party to the legal proceeding.

Service of process is a critical action that gives a court jurisdiction over the named party or parties required to be involved with the legal proceeding. However, the current system is time consuming and expensive, due to multiple duplicated steps, inefficient workflows, and the requirement of hand delivery of papers. When service must be effected in a different geographical jurisdiction, further costs can be incurred. For example, a local process server who handles process "requests" in a particular way and using particular hardware and/or software must transfer the requests to another process server operating within the jurisdiction in which the papers are to be served. The second process server does not necessarily use the same hardware/software to process service requests as the first process server. Because there is little standardization in the industry, requests are usually transferred between process servers by transferring the requests on paper (hard copy). Thus, the first process server must physically enter a process request using the hardware/software of their system, and then arrange to transfer the request to a second process server, who then reenters the data into their hardware/software. These hardware/software systems often include proprietary features, thereby preventing integration among different process servers. The above-described system of transferring paper between process servers is cumbersome and expensive.

It would be desirable to provide a system and method for procuring service of process through an online, integrated approach capable of operating across jurisdictional boundaries. Further, it would be desirable to provide the user with access to a set of tools that permit authoring of appropriate service requests usable in other jurisdictions by, e.g., by providing customizable process requests that take into account the relevant rules, regulations, and practices in a given jurisdiction. Further, it would be desirable to use such a system in conjunction with electronic court filings (e-filings), both public and governmental.

SUMMARY OF THE INVENTION

A system and method for online creation and integration of service of process functions is disclosed, whereby process papers can be created using online tools, maintained on the system, and integrated with outside hardware and software systems. The system is configured and arranged to procure service of process on a national and international basis, and in every jurisdiction (approximately 17,000 nationwide) in conjunction with paper or electronic filing (e-filing) of court papers. Service of process can occur before or after a court filing, in accordance with the rules of a particular jurisdiction or court. Further, the system is specifically adapted to follow appropriate procedures in both civil and criminal cases.

The system includes a set of tools for creating, accessing, and storing requests for service of process papers. A comprehensive rules engine and decision matrix (REDMAT) includes a plurality of databases containing the rules and practices of different jurisdictions and courts, such that appropriate items can be referenced and included in service of process requests interactively. Preferably, access to the system is obtained through one or more gateways linked to the Internet for accessing the web page. The web page can be operated by a system controller, which is connected to upload routines for creating new process requests, the REDMAT, and access routines for checking the real time status of existing requests. The tools provided on the system also can be integrated with e-filing or software vendors' software to permit authoring of process papers simultaneously with creating the actual papers for filing in court.

Other aspects and examples of the invention are more fully discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 8 is a screen printout of a typical process request for initiating service of process papers.

DETAILED DESCRIPTION OF THE INVENTION

Figure 1:
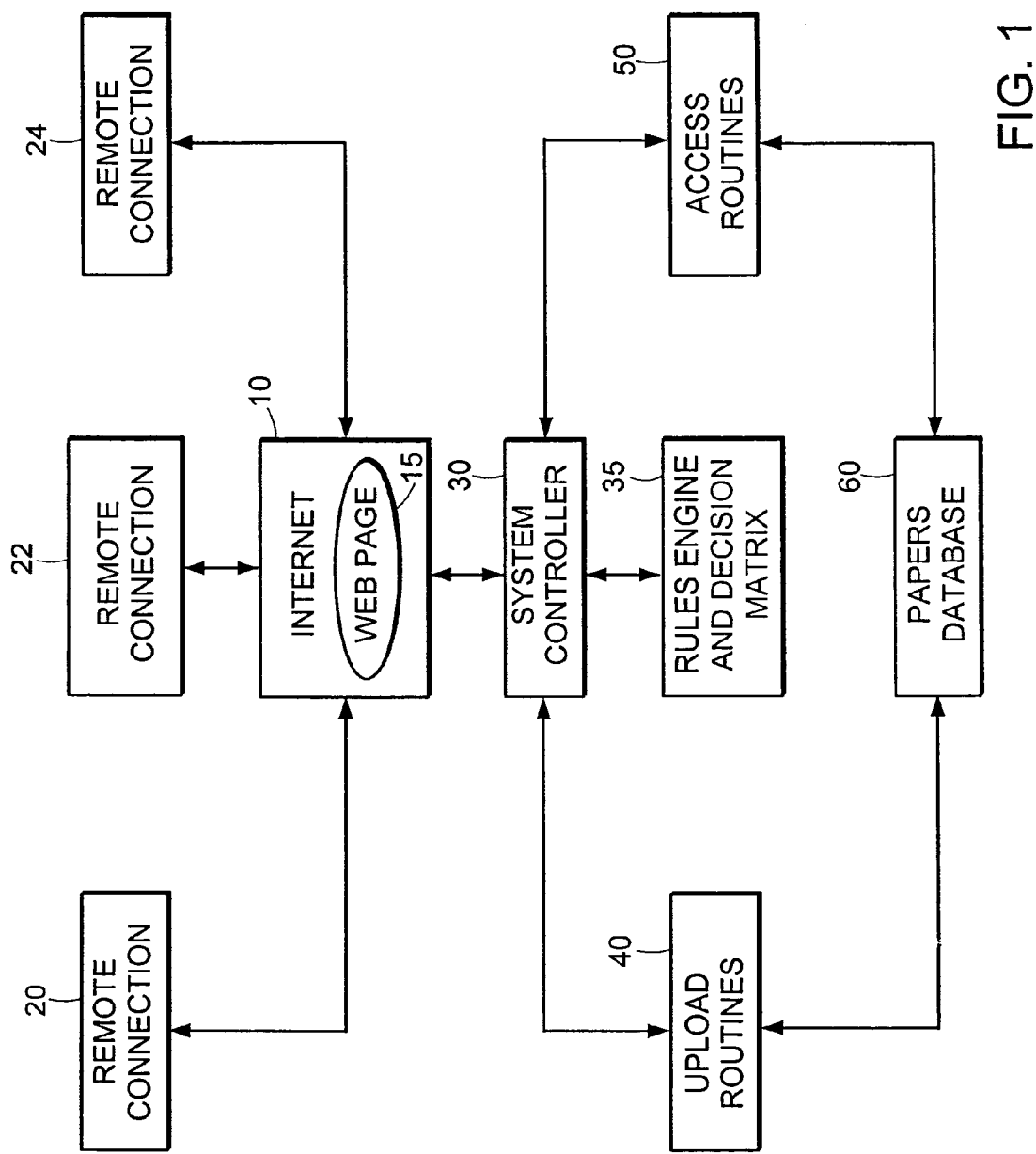
FIG. 1 is a schematic view of a system for creating and accessing process requests in accordance with the present invention.

FIG. 1 is a schematic view of an exemplary system of the present invention, the system including a set of tools for creating, accessing, and storing requests for service of process papers as used, e.g., in conjunction with a court filing. The present invention also can be used to provide for service of process in conjunction with, or exclusive of, electronic filing (e-filing) of court papers, where service can occur either before or after e-filing. As described herein, a system and method are provided for permitting users to access the set of tools over a web page on the Internet 10 or other public or private network, including through connections provided by software providers, e.g. suppliers of legal document authoring/filing/management software and e-filing software. For example, a software provider can supply a direct connection within the software to the system described herein.

Typically, the user accesses a web page 15 over the Internet in the normal manner, e.g., through one or more remote connections 20, 22, or 24. Remote connections 20, 22, and 24 are merely representative of a multitude of connections that can be made to the Internet for accessing the system described herein. The remote connections can be accessed using a variety of devices, including but not limited to desktop computers, laptop computers, televisions, mobile phones, PDAs, pagers, or other devices capable of accessing the Internet. Further, the connections can be made through any of a variety of access networks, including but not limited to LANs, WANs, mobile networks, or through links provided by software providers (e.g., in e-filing software).

As described in more detail herein, a system and method are provided to allow users to create process requests, the process requests to be served on one or more persons/parties, for use in conjunction with traditional paper filing of court documents or electronic filing thereof. Each request can be entered by a user accessing the web page 15 through one of the above-described remote connections, or through a link provided in a software package. Using the herein described invention, a user can create and integrate process requests with documents that are to be e-filed (in jurisdictions that permit electronic filings). Alternatively, a process request can be produced, faxed or scanned, and entered into the system for service of process in paper-filed court cases.

The provider web page 15 is characterized by a graphical user interface and a plurality of screens that guide a user through various options for creating new process requests, accessing existing requests, reporting modules, or obtaining status information on requests previously submitted. The web page 15 allows the user to access and update subscriber information, account information, and service of process information. In an exemplary embodiment, the web page contains a series of pull-down menus and information fields, allowing the user to select an appropriate path for viewing current information and/or for entering new information. Desired categories can be specified and information verified and entered, e.g., by clicking on appropriate menu items using a mouse, via keyboard entry, or through verbal commands.

The provider web page 15 is linked to a system controller 30 which controls and operates a provider system for receiving, processing, and updating service of process requests, and for maintaining subscriber and account information. The system controller 30 is connected with a plurality of tools for enabling users to author new process requests, and for accessing existing papers and requests. Further, the system controller 30 is configured and arranged to function with outside hardware and software systems, e.g., for authoring legal documents, as well as e-filing software systems and case or file management systems of courts.

The web page 15 and system controller 30 can be accessed through legal document authoring, software provider linking, or e-filing software. An example is Legal XML software or other software for encoding and transmitting documents in the XML format or other format, including proprietary courthouse software. Preferably, a direct link is provided in the software, such that the attorney/user can click on a box for access to the web page 15 and/or the system controller 30 of the e-process system. Therefore, process requests can be formulated according to the herein described invention in conjunction with authoring legal documents, software provider linking, or e-filing (public/governmental).

The system controller 30 is connected with a rules engine and decision matrix (REDMAT) 35, which includes hardware and interactive software for accessing rules for formulating process requests and carrying out service of process in all jurisdictions, rules for electronic filing of court documents in jurisdictions that permit such filings, and information relevant to user accounts and operation of the web page.

Upload routines 40 are linked to the system controller 30 for allowing users to match process requests with requirements by jurisdiction and/or court. The type of civil or criminal process request can be matched with available methods for serving process. By entering the upload routines, the user can access available online software tools to create electronic process requests while referencing the rules and decision matrices provided in REDMAT 35. Preferably, these rules and decision matrices are provided in the form of tables and/or information fields that are interactive, thereby providing the user with appropriate menus at different points in the process. Pop-up screens and other functional tools can be used to implement the interactive features. For example, once a jurisdiction and/or court are specified, filing fees and witness fees can be provided in a menu or box, enabling easy selection and renumeration. Filing and witness fees can be paid, when required, by the process server upon filing of the court case or at another time through the e-process system. Such fees can be collected from the attorney/user and transferred/loaded onto a smart card, debit card, e-cash, or other money transfer service for presentation to the court or remittance to the person being served. While navigating upload routines 40, the user is provided with the option of specifying a particular process server to handle service of the papers. The attorney/user can also arrange for a "no click" service whereby no additional contact is required by the requesting user whether a process server is specified or not, and the user's account on the e-process system is configured to provide immediate confirmation to the user when service is initiated and effected, and thereby informing the user by email, facsimile, telephone, etc. that service was begun and completed. With such an arrangement, a process server can be notified immediately by the e-process system when papers are ready to be filed and/or served, thereby bypassing further branches of the system.

After a process request has been inputted by the user, the request can be submitted to the system by following the appropriate screen instructions, e.g., by clicking on the appropriate box or icon. The system controller 30 provides for time stamping of the request, thereby keeping track of submission dates and times which are maintained in a searchable index for use by the user and others.

Access to existing papers and active process requests is provided through access routines 50. The access routines 50 provide a means for allowing certain users to view, print, and/or modify existing papers or process service reports in the system. The level of access permitted to specific users is a function of their status and relation to the particular matter.

A papers database 60 provides a location for storing papers that have been submitted to the system. The papers database 60 is accessible through upload routines 40, e.g., in order to receive new papers entered into the system, and can be reached through access routines 50 for access to existing papers. Papers database 60 generally refers to one or more databases, e.g. made up of hardware and software, that perform a storage function. The papers database 60 interacts with submission and retrieval components present in upload routines 40 and access routines 50, respectively.

Figure 2:
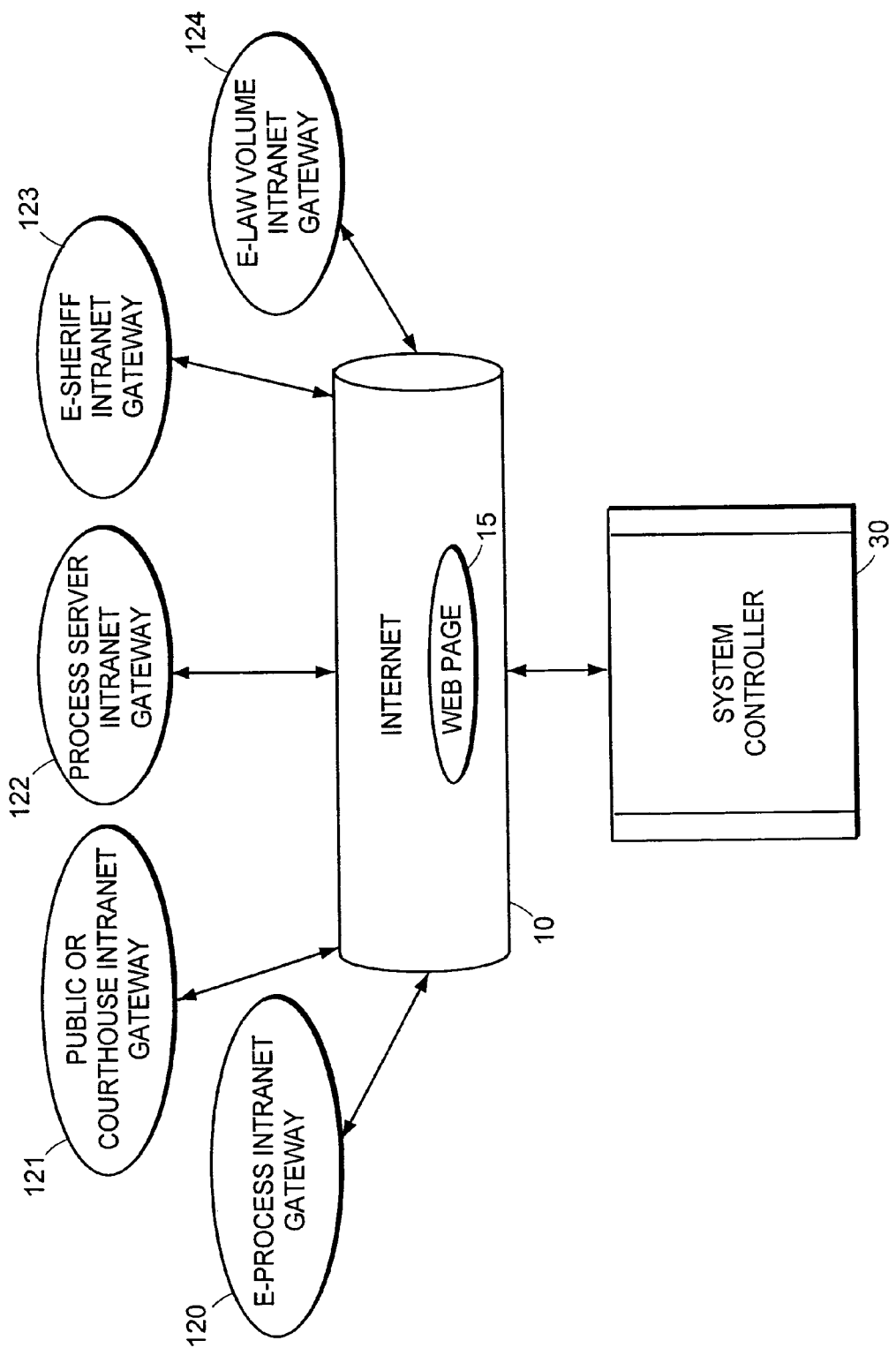
FIG. 2 is a schematic view of selected gateways for accessing the system of FIG. 1.
Figure 3:
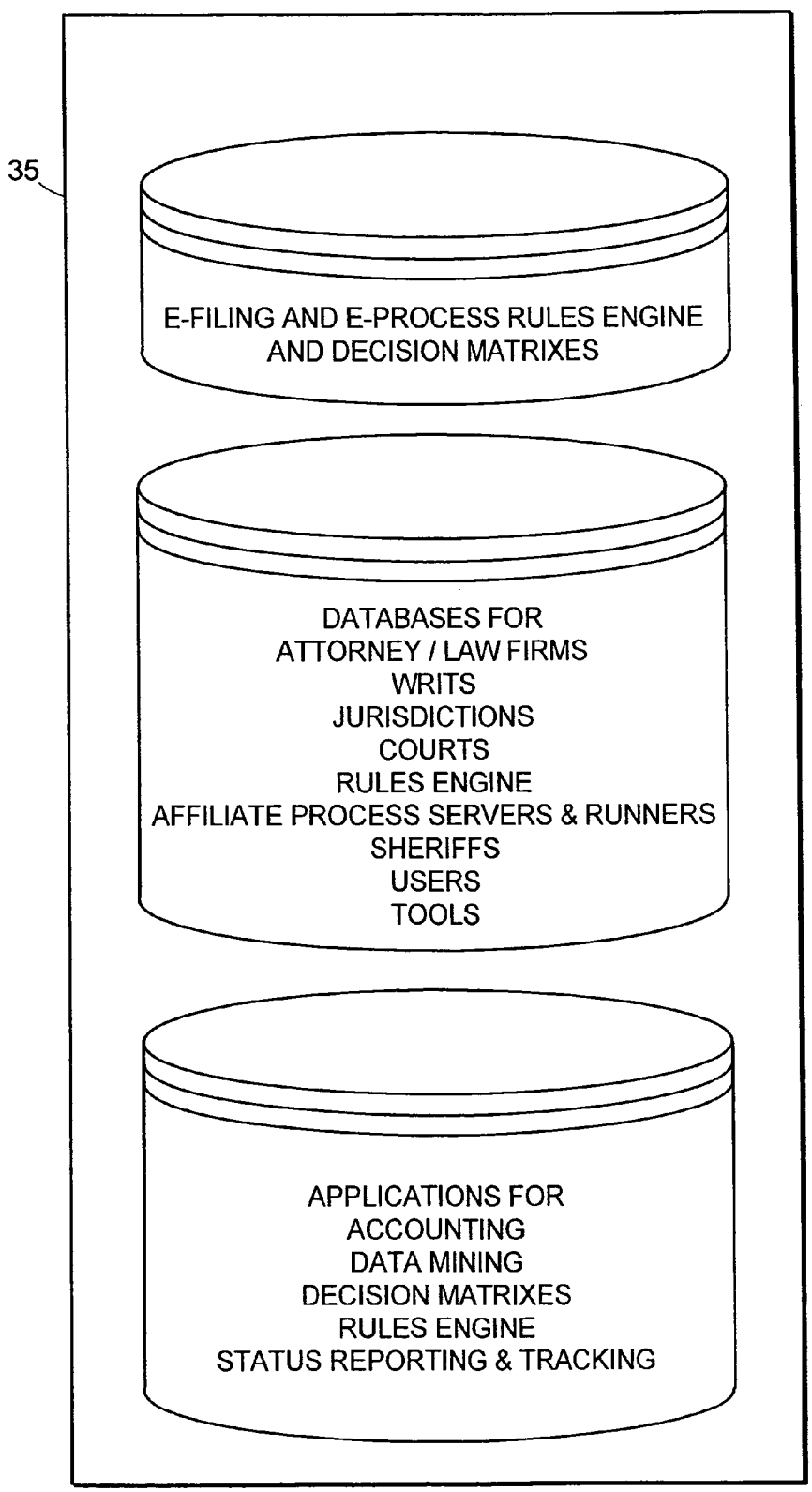
FIG. 3 is a schematic view providing details of the rules engine and decision matrix depicted in FIG. 1.

With reference to FIG. 2, details of the remote connections as embodied in a plurality of gateways will now be discussed. As used herein, the term "gateway" refers to the aforementioned remote connection, as well as the web page or system entry tools for accessing and conducting transactions on the system. Gateway can also refer to a means for accessing the system through independent software, such as legal document authoring software and e-filing software. The gateways can be different for each group or class of users. Preferably, different screens or menus are made available to specific groups of users, who can be classified according to, e.g., their roles in serving process, or according to how they obtain access to the system. Accordingly, registered users and other users permitted access to papers on the system can obtain access to the web page via the Internet or other public or private network through respective remote connections, i.e. gateways 120, 121, 122, 123, and 124.

Attorneys and other registered users can access the system through an e-process gateway 120, accessible by a group including but not limited to attorneys, paralegals and other attorneys' assistants, law firms, corporations, corporate agents, government agencies, and resellers of services related to functions performed on the web page, e.g., litigation service organizations. The system includes one or more security validations, such as requiring use of a user name/password or other code, and any other security procedures known in the art including encryption technology. Upon validation, users accessing the system through the e-process gateway 120 are directed to the web page 15, and a unique tracker number is assigned to the transaction.

Public or courthouse Internet gateway 121 allows access to the web page for the general public (enabling pro se service of process), including persons such as court personnel, for convenient access to information in the public domain, such as docket numbers of court cases that have been filed. Public access is also provided in order to demonstrate and offer the capabilities of the system of the present invention and for allowing integration with other systems.

Process server Internet gateway 122 provides access to the web page for persons or firms such as process server affiliates, independent process servers, and process server runners, who have been assigned or potentially could be involved in processing process requests or court filings. Such users can be provided with unique identifying codes or other security designations, thereby permitting limited access to the papers of a given transaction. For example, users of the gateway 122 preferably are permitted to upload or download papers via the Internet, but are not permitted to alter the content of existing papers. Such users also can access the web page or a replicated version of the web page from the field via a mobile unit 157 (see FIG. 5) for obtaining information from the web page, uploading information, or providing confirmation when process has been served. As used herein, the mobile unit 157 collectively refers to one or more hardware/software devices used by process servers to download and upload information to the system. The mobile unit 157 preferably is a PDA or other portable access device such as a laptop computer capable of accessing the web page or otherwise accessing the system.

E-sheriff gateway 123 permits access to the system by law enforcement, i.e., federal, state, or local officials including sheriffs, deputies, constables, and U.S. Marshals. In some jurisdictions, these officials are required by statute or judicial decree to be the only method for service of legal process. Gateway 123 allows the relevant officials to upload or download papers and present proof of service to the system. This gateway functions similarly to the process server gateway 122, e.g., allowing access to online papers for printing and serving stored papers via electronic or paper means in the field and accessibility for data mining by law enforcement agencies for investigative purposes. Field access can be obtained through the mobile unit 157.

Figure 7:
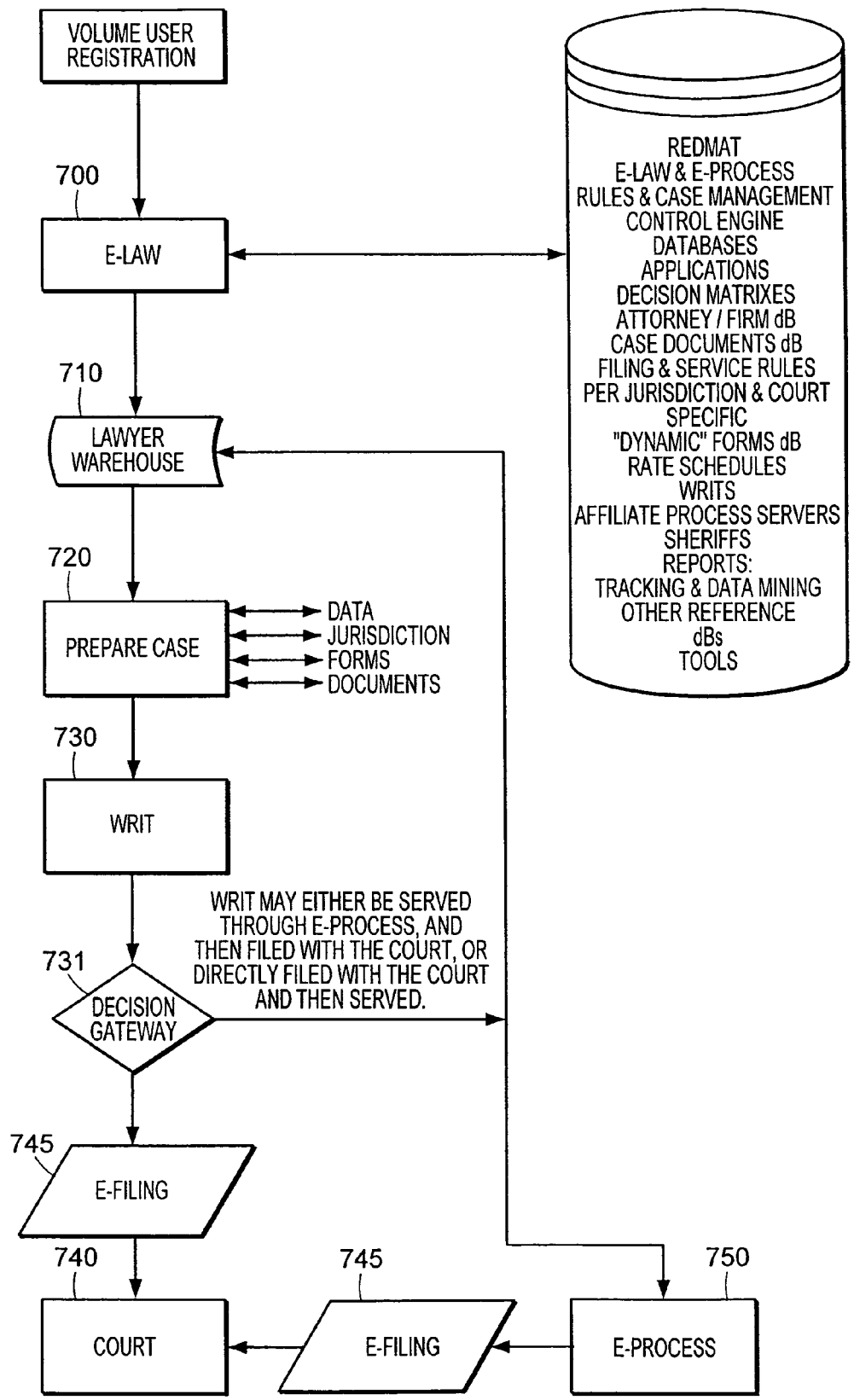
FIG. 7 is a schematic view of a flow diagram of process service for volume users.

E-law gateway 124 is a gateway designed for volume users, such as those processing foreclosure papers, eviction notices, collection notices, class action suits, and divorce papers, on a local, national, or international basis. The gateway 124 can provide a direct connection to registered agents or corporations themselves, to facilitate processing of transactions having complex process serving requirements. FIG. 7 is an exemplary process flow tailored to the requirements of volume users.

According to an exemplary method of the present invention, users access the web page 15 over the Internet 10 using one of the above-described gateways. The system controller 30 initially provides validation of users, and upon validation, transmits a screen including one or more menu items, according to the user's status on the system.

For customers and subscribers accessing the system through e-process Internet gateway 120, such users are provided with access to upload routines 40 and access routines 50 as used in conjunction with the rules engine and decision matrix (REDMAT) 35.

Figure 4:
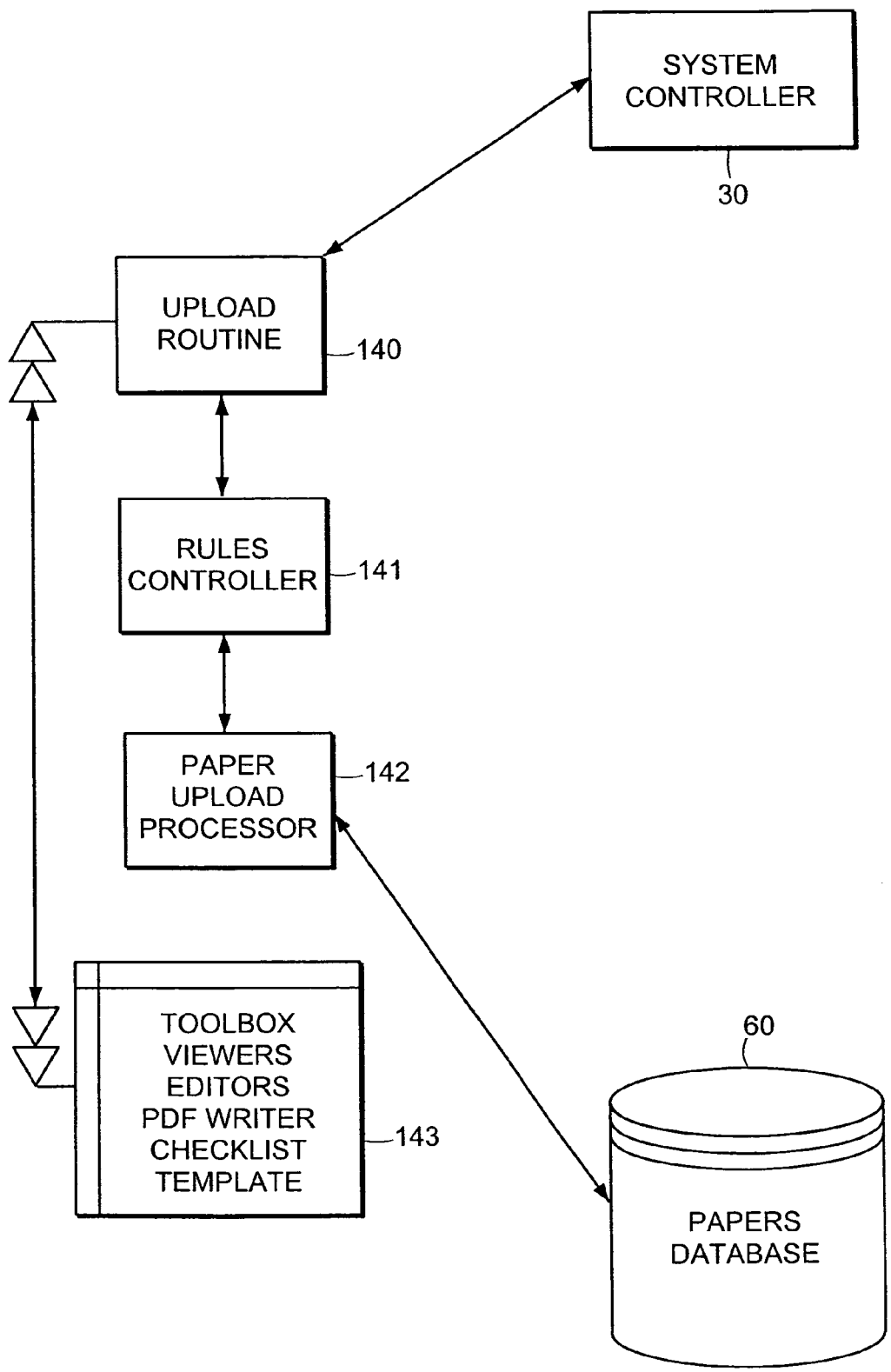
FIG. 4 is a schematic view of the upload routines shown in FIG. 1 and elements of the system comprising the upload routines for performing related functions.

FIG. 4 provides an example of upload routines 40 adapted for use on the system. The system controller 30 is linked to an upload routine 140 which can include one or more routines or paths enabling creation of a process request for service with or without e-filing. In conjunction with creation of a process request, e.g., the user can access a toolbox 143 containing various known software tools for document and image production, including but not limited to viewers, editors, PDF writers, and checklist templates. Such software tools can be accessed by the user on the desktop and integrated into the request.

The upload routine 140 is operably connected with the toolbox 143 and a rules controller 141, which accesses RED-MAT to determine a rules set for a given transaction. As used herein, the term "transaction" refers to a process request and papers relating thereto for service of process with or without e-filing. The rules set for a particular transaction is determined based on user data entered by the user on the web page, which establishes a set of parameters governing the preparation of the transaction papers. Preferably, creation of process involving the aforementioned rules set is presented to the user in an interactive format, as described above. For example, user data can include the name of the parties involved, the address for service of process, and the jurisdiction and location of the court where the papers are being filed. The rules controller 141, operating in conjunction with REDMAT 35, then provides interactive output and guides the user through selection of criteria appropriate for the jurisdiction and/or court.

A paper upload processor 142 linked to the rules controller 141 attaches a tracking number or other inventory control information to the transaction. Additionally, the processor 142 can be configured to run an encryption algorithm to encrypt the papers or documents of the transaction for storage in the papers database 60. Encryption is especially important in criminal proceedings, where many court papers are confidential, or for process service which occurs prior to e-filing, i.e. prior to public disclosure of the filing papers. It will be apparent to those skilled in the art that the encryption algorithm can encompass known technologies and encryption techniques.

During creation of a request using the upload routine 140, the user is prompted for information such as the type of process (criminal or civil) and the jurisdiction. In response to data entered by the user, the rules controller 141 interactively guides the user through choices corresponding to the appropriate rules governing service of process in the jurisdiction or court. The rules controller accesses REDMAT 35, which includes multiple databases containing rules classified by jurisdiction and type of criminal or civil process. The REDMAT 35 further contains accounting information such as billing and fee collection information for given transactions and subscribers, as well as tracking data for the various transactions maintained in the papers database 60.

REDMAT 35 governs processes related to transforming civil or criminal papers entered by users into process requests suitable for service in accordance with the rules of a particular jurisdiction or specified court. REDMAT 35 also maintains databases of affiliated process servers and runners by jurisdiction and type of service. Accordingly, upon completion of a new transaction and submission of the request to the system, including certification by the user that the transaction is ready to be filed or served, the system controller 30 automatically selects a process server in accordance with predetermined criteria. For example, if the user has specified a particular process server, service will normally proceed after automatic notification to the process server via the system controller 30. Notification can occur by email, facsimile, instant messaging, web site posting, or any other automated or non-automated communication method.

If the user has not specified a particular process server, one is chosen by the system controller 30 based on selection criteria in REDMAT 35. REDMAT 35 is configured and arranged to assign transactions to particular process servers based on any number of criteria, which can include qualifications, availability, past service record, price, timeliness, and location. REDMAT 35 can be configured to produce a score for each vendor (i.e. process server) based on these criteria or other criteria. Alternatively, REDMAT 35 can alert a plurality of process servers qualified for process service in a jurisdiction that papers must be served for given transaction(s) and initiate an auction for these transaction(s). Assignment of a transaction can occur based on email notification or any other communication method, as listed above.

Figure 5:
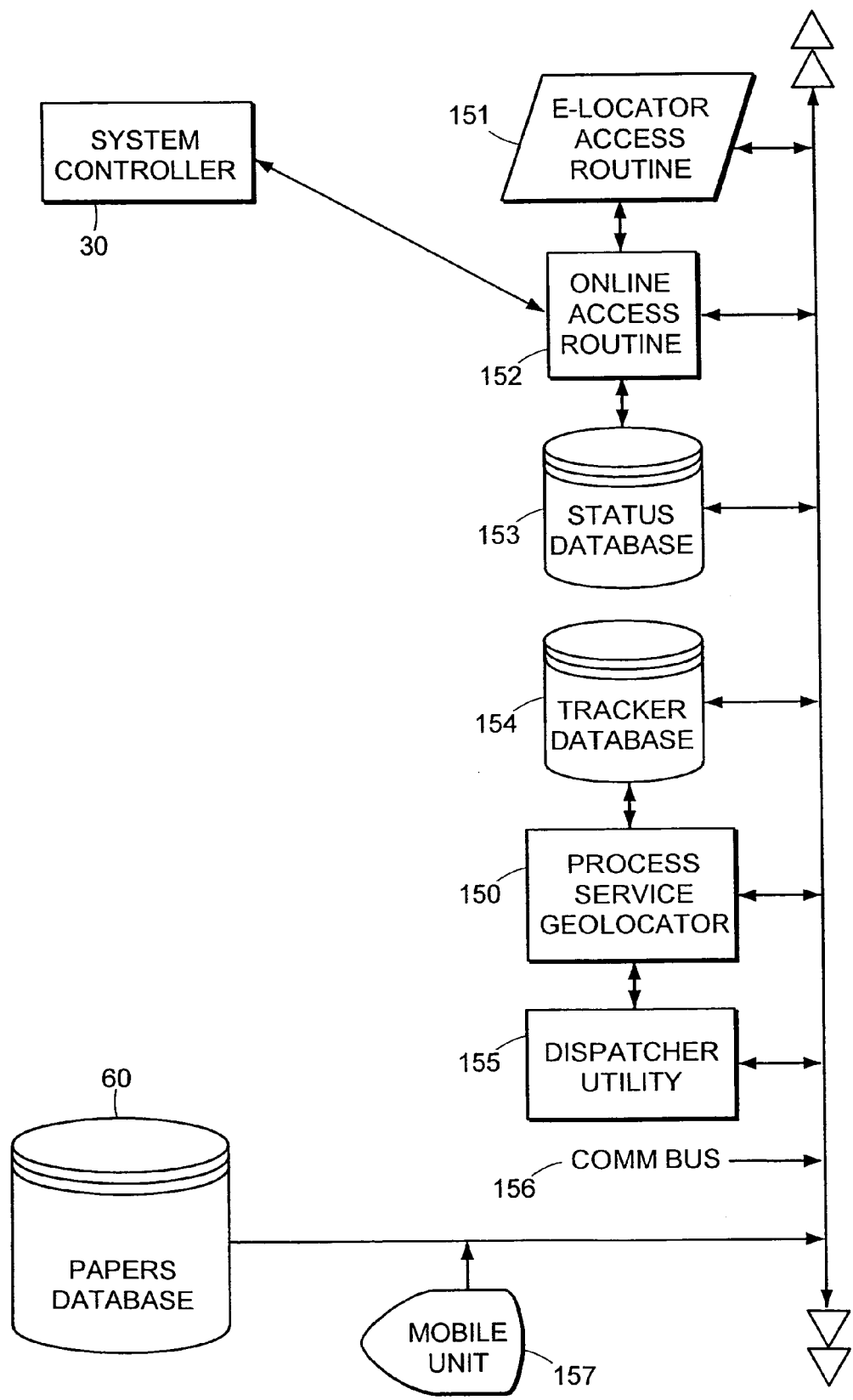
FIG. 5 is a schematic view of the access routines shown in FIG. 1 and elements of the system comprising the access routines for performing related functions.

FIG. 5 provides an illustration of access routines 50 useful for uploading and obtaining access to the status of existing papers stored on the system. The system controller 30 is linked to an online access routine 152, which allows users to access papers stored on the system. For example, users accessing the system through e-process gateway 120 who are validated on the system for particular transactions can access those transactions to view the papers, obtain status information, and/or make changes to service information. The online access routine 152 is connected with a status database 153 which maintains the status of papers stored in the papers database 60. When queried by the online access routine 152, the status database 153 can return status information, which is provided to the user over the web page 15.

Process servers and other persons accessing the system through process server gateway 122 are provided access to papers through a dispatcher utility 155, which is connected to the system controller 30 via the online access routine 152 and a communication bus 156. The dispatcher utility 155 provides information related to the service of process papers, including detailed service instructions and any specific requirements associated with the papers. The dispatcher utility 155 also is configured and arranged to receive updated information for existing transactions, including information related to confirmation of service (e.g. return of service) or failed attempts at service. Each time an update is received, the update is time stamped and GPS (Geolocator) stamped and entered into the system under the relevant transaction.

Such real time updates also can be received in the system through the communication bus 156, and specifically, via the mobile unit 157. The mobile unit 157 is a combination of hardware and software preferably running on a PDA or laptop computer of the process server, who forwards service of process information to the system. For example, when service has been successfully completed, the process server initiates a sequence on the PDA to transmit information sufficient to allow the system to generate a return of service document. Alternatively, unsuccessful service attempts can be transmitted to the system, where they are time and GPS stamped and logged. The mobile unit 157 can include known security features such as digital or electronic signatures, digital photographic imaging, biometrics such as finger/voice/facial recognition technologies, along with electronic tagging of location and identification according to global positioning and electronic mapping, to act as proof of service or status verification and proof of witness fee payment by smart card or other payment method.

Information obtained from the mobile unit 157 is received over the communications bus 156 and transmitted to the system controller 30 via the online access routine 152. The system controller transmits the information to status database 153 and tracker database 154, where the particular account is updated, as well as the REDMAT 35, where the information can be mined as streaming information to update other accounts on the system, and further collected, analyzed, and stored in the REDMAT 35.

The dispatcher utility 155 is connected to a process server geolocator 150, which after submission of a process request, automatically verifies whether the supplied address is valid and correct by cross-referencing the address against existing databases and checking for accurate matches between zip code and city/town, street address and name to zip code and city/town, and named persons using data such as social security number, drivers license number, date of birth, known aliases, automobile and property titles, etc. The existing databases include those housed within REDMAT 35 and proprietary databases operated by outside vendors. Verification of addresses and other personal information assists in preventing unnecessary service expense, and information obtained as a result of such checks can be inputted and maintained in REDMAT 35.

Also connected with the communication bus 156 is a tracker database 154, which in response to user queries, accesses the various databases in the papers database 60 to retrieve papers corresponding to specific tracking numbers, and is also capable of communicating relevant information to process servers in the field using known GPS or other satellite/mapping technologies.

As shown in FIG. 5, an e-locator access routine 151 is connected with the online access routine 152 and the communication bus 156. The e-locator access routine 151 can operate in conjunction with the geolocator 150, tracker database 154, and REDMAT 35 to provide verification of persons and places involved in process service, e.g., by using skip tracing or other known technologies.

In accordance with the above-described invention, the web page 15 can function as a single site or multiple sites for allowing the user to create process papers online and then storing those papers in the papers database 60, which encompasses both online and off-line hardware and software for housing data. The web page 15 can refer to multiple linked sites that offer an integrated framework for maintaining process papers. Preferably, the web page 15 allows process papers and court filings to be created, stored, and accessed by users, and provides for automatic service of process papers upon demand, including integration with systems and devices used by process servers. The web page 15 or other access medium connected with the system controller 30 can be reached via direct connections provided in legal document authoring software (e.g. Legal XML), e-filing software, and proprietary court/jurisdictional software. Various service methods can be accomplished using the present invention. Service can be performed by hand delivery, mail delivery, facsimile, or other means of service permitted in a given jurisdiction. The e-process system can bypass process servers altogether and provide for service by email in jurisdictions where such service is permitted. Alternatively, special arrangements can be made with process servers to carry out service by email.

Figure 6A:
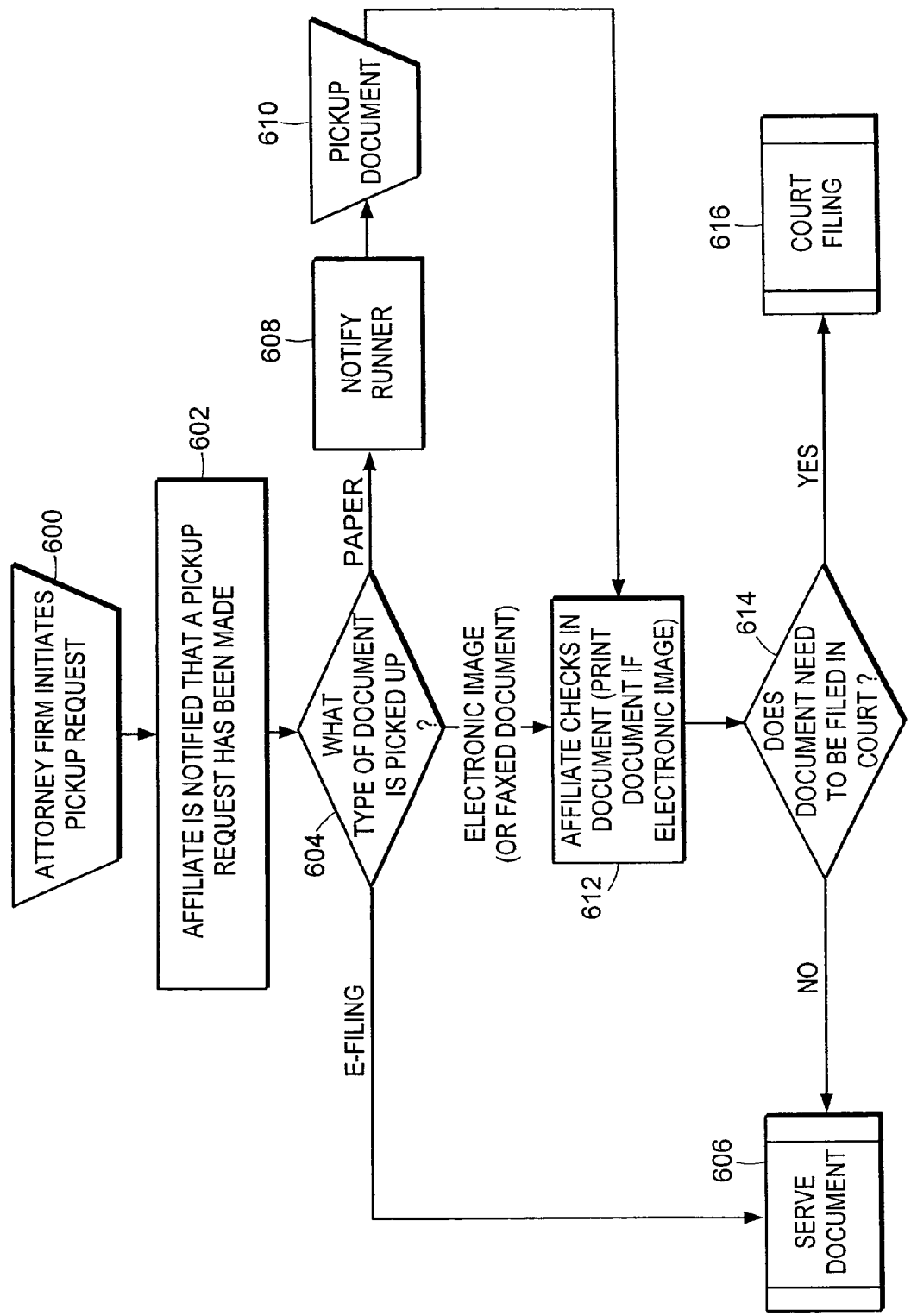
FIGS. 6A-6D are schematic views of a method of initiating and serving process in accordance with the present invention.

FIGS. 6A-6D provide an example of a typical flow diagram for court filings and process service, in accordance with the present invention. FIG. 6A provides the overall system flow from initiation of a court filing to service of process. The attorney, firm, or other person initiates use of the system in conjunction with a court filing, either for a conventional paper filing or an electronic filing (e-filing). At step 600, the attorney notifies the system provider, e.g., by telephone, facsimile, or electronic contacts that court documents are ready to be picked-up and filed in a specific jurisdiction and court. For example, if the attorney is using e-filing software or legal document authoring software, a link can be provided to the e-process system of the present invention, connecting the attorney's computer/access device with the web page 15 or other software for accessing the system. Alternatively, the attorney can access the e-process system through a remote connection (e.g. e-process gateway 120) and log on to the web page to initiate a pick-up request. The pick-up request can proceed from the normal flow in the system, whereby the attorney formulates a process request and submits the request to the system. Alternatively, the attorney can specify a particular process server using a "no click" feature and all subsequent forwarding through the system is automatic and whereby upon completion of service, the attorney is immediately notified, preferably by email, that service has been effected and the corresponding return of service can be sent directly to the attorney's file/case management software or to the e-file enabled court's corresponding case file.

Upon receipt of the pick-up request, the request is manually entered into the system (e.g., for phone or facsimile requests), or has already been submitted to the system electronically (e.g., for requests made through the web page 15). The system controller 30 then queries REDMAT 35 at step 602 to select an appropriate process server based upon the predetermined criteria, preferably choosing the process server from a network of affiliated process servers with whom the e-process system has a pre-existing relationship. If a process server has been specified under the "no click" feature or simply specified by the user, the papers can be automatically and immediately forwarded for service and could in an e-file enabled court or in a jurisdiction allowing electronic transfer of documents and/or e-signatures be transferred directly into an affiliate or independent process server's vehicle in their respective local area. The system is configured to determine based on inputted information whether the submitted papers correspond to an e-filing or a paper filing (step 604). In the case of e-filing, service of the papers can be effected at step 606. Service can occur either before or after e-filing, depending on the rules of the jurisdiction or court.

Assuming the papers are to be paper filed, it is further determined at step 604 whether the papers that have been supplied are in paper or electronic form. If in paper form, the papers must be picked up, wherein at step 608 a runner is selected from runners provided in existing databases of REDMAT 35 (or through selection by the attorney) and notified by the system controller 30 that the papers must be picked up (step 610). Runners can be automatically selected by the system in a manner similar to process servers, runners can be correlated with process servers in specific jurisdictions, or they can be selected through courier services. At step 612, the selected affiliate process server obtains from the system the papers to be filed, e.g., by accessing the system through the dispatcher utility 155. The process server reviews the instructions provided on the system to determine whether filing in court is required, or if service of process can proceed without court filing (step 614). In the normal course of events—but not always, court filing is required prior to service of process, and thus the process server commences filing in a specific jurisdiction/court at step 616.

Figures 2, 6B:
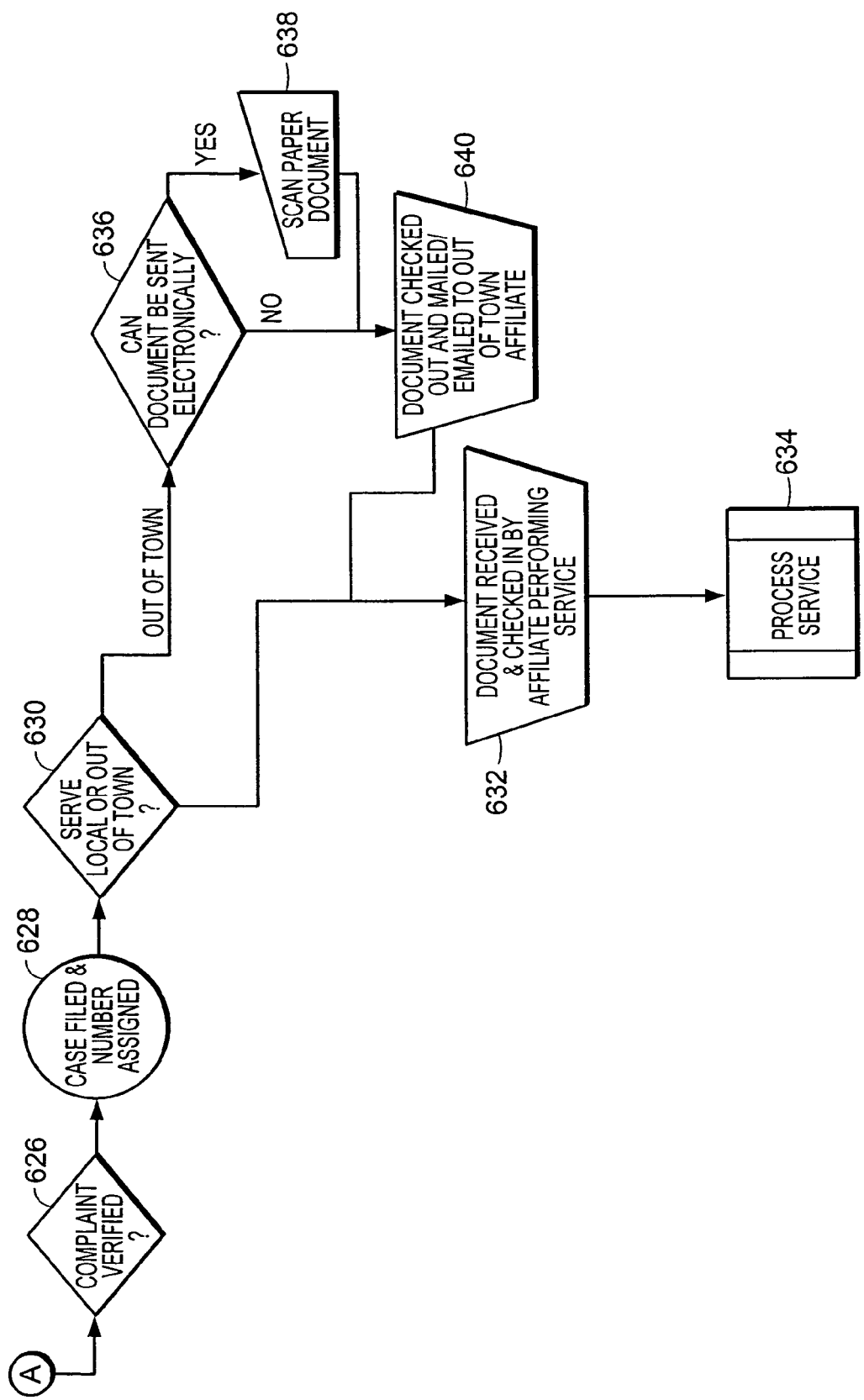

In FIG. 6B, a more detailed diagram is provided with respect to the interplay between court filings and the e-process system. In step 618, the system controller 30 determines whether the attorney/user has specified paper filing or e-filing. For e-filing, the case is filed electronically at step 620, and verification of the electronic filing occurs at step 622, e.g., by return receipt to the system.

In a jurisdiction where process serving is allowed prior to filing a case, the e-process system will allow for status updates, as stated above, and will then upon service being effected be able to file the court papers directly for the attorney/corporation/government agency/individual with no further contact (i.e. "no click") back to the originating document source. Thus, the filing can be automatically executed, either through e-filing or a paper-to-paper mode.

After filing of the case in the court 626, a case or docket number is assigned at step 628. The system controller 30 then determines whether service of process must occur locally or out-of-town from the home location of the e-process system operator. For local service, an affiliate process server is selected based on predetermined criteria (step 632), and service of process occurs at step 634. For out-of-town service, the system controller 30 selects a process server and then, in accordance with the known capabilities of the selected affiliate process server, determines whether the papers can be sent electronically, in which case the papers are scanned if necessary at step 638. If electronic transmission to the affiliate process server is not possible, then the papers are checked out of the system and mailed, couriered, or emailed to the out-of-town affiliate process server (step 640). For papers sent by mail or courier, a bar code can be attached to the package, thereby allowing integration with codes provided by the shipper (e.g., UPS or FedEx) so that the status of the papers during transit can be determined, and further for integration with the process server. The papers are received and logged in by the process server at step 632, and service of process is commenced at step 634.

For paper filings, the system controller 30 determines whether the papers must be filed in a local or out-of-town court (step 642). For local filings (where the court is located within the local area of the e-process system operator), the case is prepared by the operator or an affiliate at step 644 and taken to court (step 646) where it is filed. Verification of the filing and submission to affiliate process server(s) occurs as described above for e-filing.

For out-of-town court filings via paper, the system controller 30 determines whether the papers can be handled in electronic form by the selected affiliate process server, and if so, scans the papers at step 650 and checks out the papers to be mailed or emailed to the process server (step 652). Alternatively, for papers that cannot be handled electronically, the papers are prepared for filing at step 654 and then transmitted to the process server. Papers received by the process server are checked in (step 656), and it is determined whether the papers are in electronic form (step 658). If the papers are in electronic form, they are prepared for filing (step 644) or if in paper form, simply filed in court (step 646).

Figure 6C:
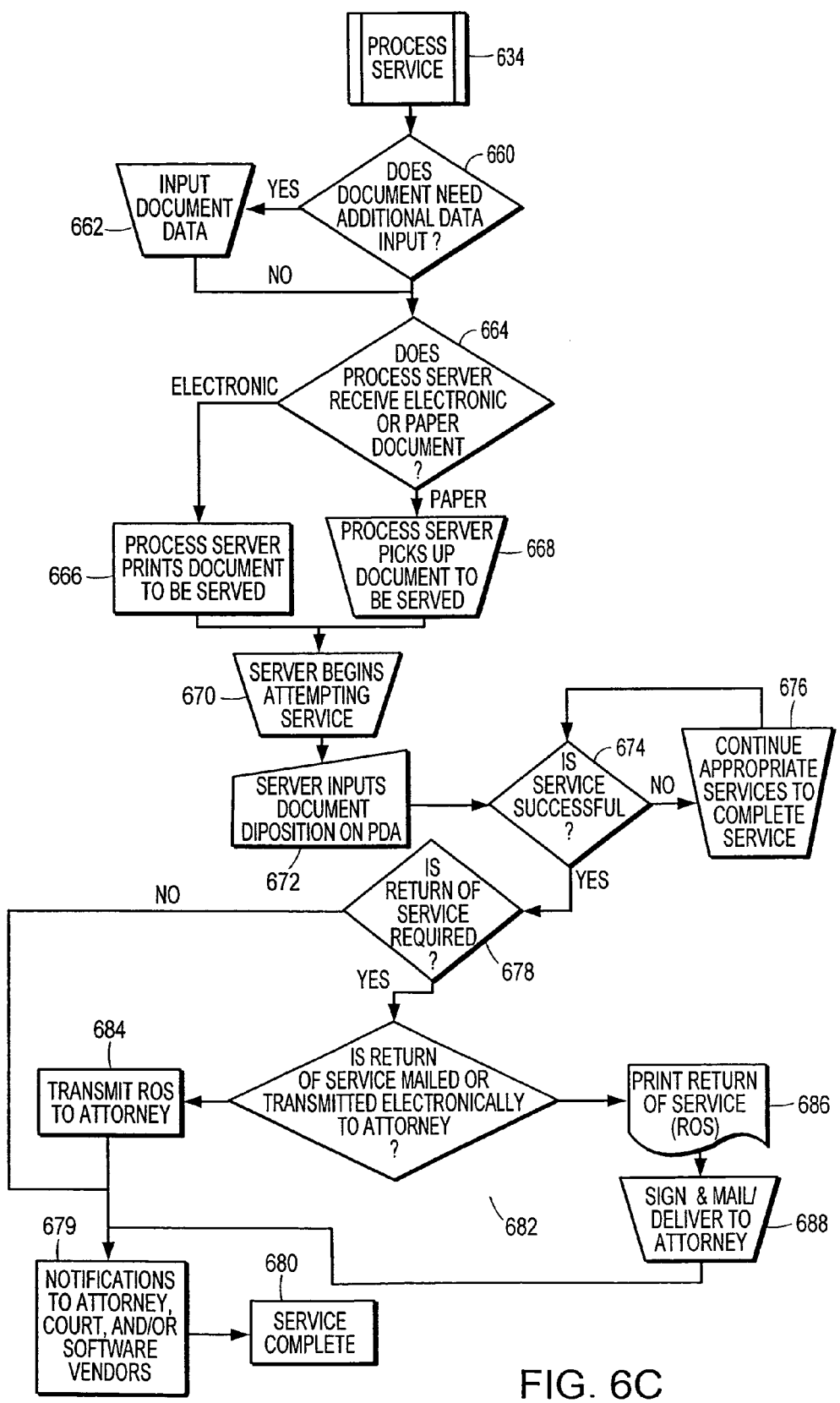

FIG. 6C depicts in more detail steps for process service up through the completion of service. At step 634, service commences and the process server determines whether additional data must be inserted into the filing/process papers (step 660). Data input (step 662), if necessary, can be made using the e-process system by accessing REDMAT 35 via the web page 15 and system controller 30. Step 664 requires a determination of whether the papers are in electronic or paper form. If in electronic form, the papers must be printed out (step 666); if in paper form, the process server picks up the papers to be served (step 668) or otherwise receives the papers through fax, mail, etc. For papers received by mail, preferably a bar code is provided on the package, as described above, thereby tying together the e-process system and the tracking software of UPS, FedEx, or other shipper.

At step 670, the process server attempts service on the individuals or parties named in the process papers. The result of each service attempt can be inputted into the process server's mobile unit 157 or otherwise entered into the e-process system. For example, at step 672, the process server can communicate with the e-process system via a PDA configured as the mobile unit. If service is unsuccessful (step 674), then the process server continues making attempts to complete service while complying with instructions provided by the e-process system (step 676). If service is successful, then the process server determines whether return of service is required (step 678), and if not, then step 679 is commenced, whereby notifications of successful service and the return of service can be provided to software vendors (e.g. directly into file and case management software), e-filing enabled court case/file systems, and e-filing software vendors, where required. After notifications are sent, service is completed (step 680) and the process server updates the e-process system with the required information. Email confirmation also can be sent directly to the attorney/user.

If return of service is required, then it is determined whether the return of service document is to be mailed or transmitted electronically to the attorney (step 682). For electronic transmission (step 684), the document can be transmitted directly to the attorney. For paper transmission of the return of service document, the process server prints out the return of service document (step 686) and mails it to the attorney (step 688).

In conjunction with the above-described court filing and service of process procedures, often it is required that witness fees, court fees, or other fees be paid upon filing a case or within a short time thereafter. To pay such fees, the process server can be equipped with a smart card, debit card, or other payment mechanism appropriately loaded with the correct fees. Such fees can be prepaid by the attorney/user when arranging for process service on the e-process system. Alternatively, such fees can be billed to the user's account after service of process. Preferably, the process server can receive such payments via the mobile unit 157.

Figure 6D:
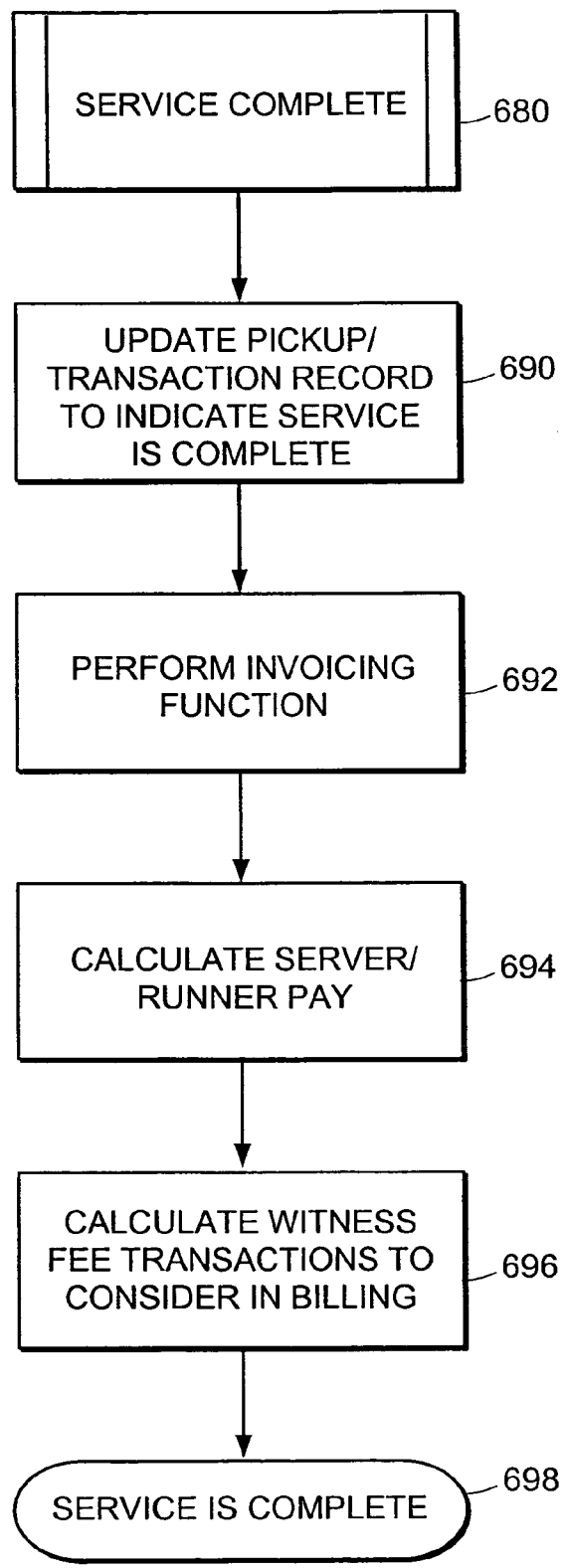

As seen in FIG. 6D, upon completion of process service, the transaction record in the e-process system is updated, e.g., in status database 153, tracker database 154, and REDMAT 35, to indicate that service is complete (step 690). The system controller 30, in conjunction with REDMAT 35, generates an invoice or otherwise updates the subscriber/user account in accordance with billing practices (step 692). In step 694, pay for the process server and/or runner(s) is calculated based on predetermined rates. In step 696, witness fees can be calculated and applied to the user account, leading to completion of the entire process (step 698).

FIG. 7 illustrates a typical process flow for volume users. Users can access the system through e-law gateway 124, specifically designed as a gateway for volume users, such as those users processing foreclosure papers, eviction notices, collection notices, class action suits and divorce papers. Users can register and log-on to the Internet 10, thereby accessing a web page operably connected with an e-law process controller (step 700), which can be the system controller 30 or a separate controller running in conjunction with the system controller. The e-law process controller is linked with REDMAT 35 or a portion thereof for case preparation utilizing complex rule sets and decision matrices often encountered in volume court filings and process service. The attorney/user can utilize as co-counsel affiliated lawyers from the Lawyer Warehouse database in step 710. The case continues to be processed and prepared through step 720 including necessary data, jurisdiction and court rules, form templates, or associated documents. A writ (i.e. court papers) is prepared (step 730) and then filed via Decision Gateway (step 731) allowing the writ to either be filed through e-filing (step 745) with the court 740 or pre-served via e-Process 750 and then e-filed with the court 740 through e-filing 745. The rule sets within REDMAT 35 also match filing and/or process service requests with available process servers by zip code and or jurisdiction and court.

Figure 8:
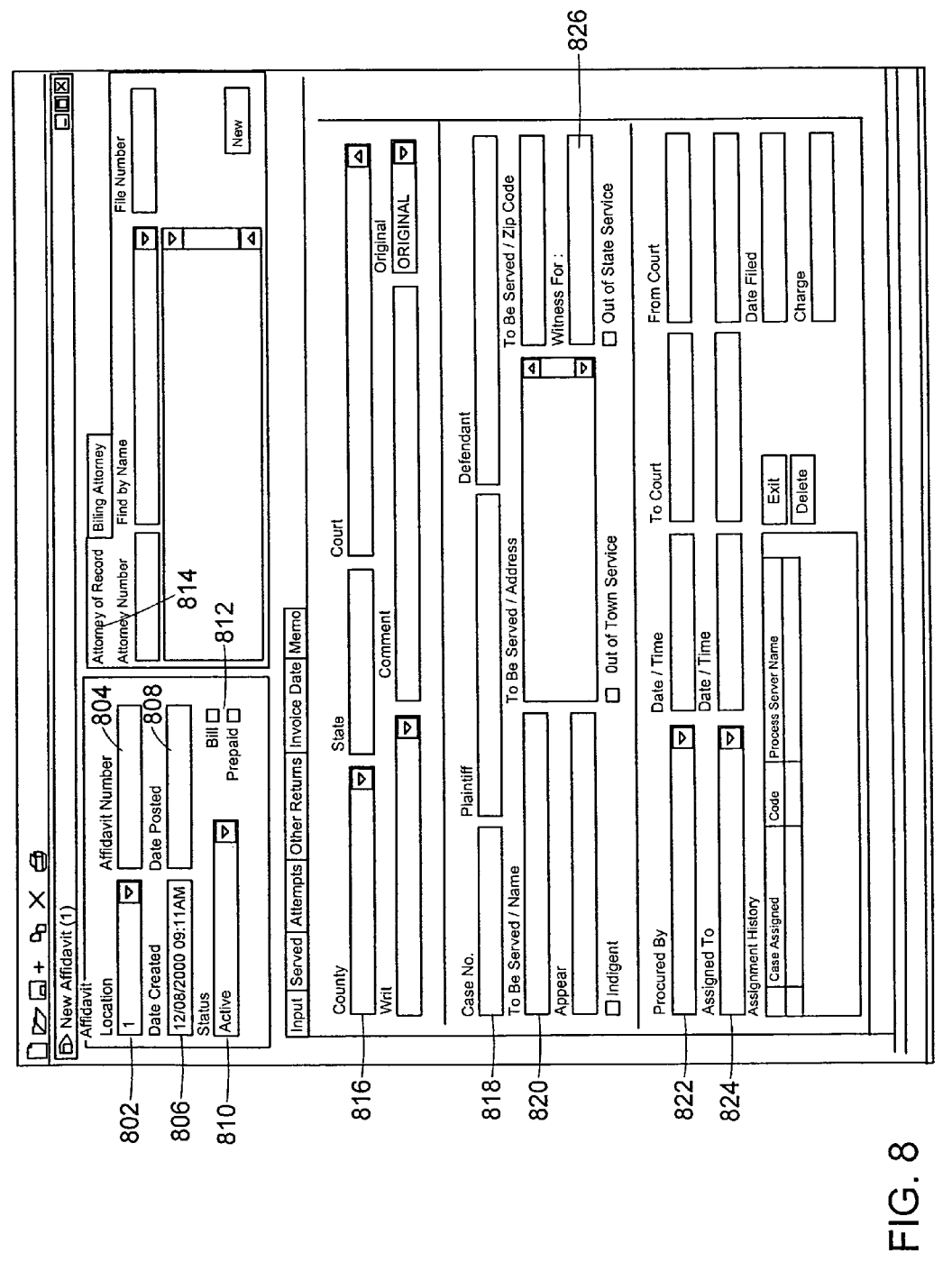

FIG. 8 is a sample screen printout from the e-process system web page. Upon registration on the system or for returning users, the screen of FIG. 8 is available for creating a new process request. A plurality of fields require entries by using the keyboard and/or clicking on the mouse. In field 802, the user's location is specified (as shown, the provided location is "1" specifying the primary user location or access gateway). An affidavit number is requested or assigned in field 804. The date of creation of the request (field 806) and the date of posting (field 808) are provided, along with the current status of the request (field 810). Field 812 requires clicking on a billing status (e.g. "bill" or "prepaid"), or alternatively containing a default status for a particular user. In field 814, attorney information including attorney name and address is provided or requested. The remaining fields are directed toward obtaining case information and/or specific process service information, including location of the court (field 816), identification of the parties (field 818), name/address of person to be served (field 820), case status information (field 822), process assignment (field 824), and witness fee (826). The above fields are illustrative of a typical screen for initiating a process service request. Other information can be obtained elsewhere in the software.

Although a preferred embodiment of the invention has been described using specific terms, such description is for illustrative purposes only, and it is to be understood that changes and variations may be made without departing from the spirit or scope of the following claims.

What is claimed is:

1. A system for carrying out service of court documents, comprising:
   a network for receiving user data and one or more court documents to be filed electronically or paper filed, the network being accessible through one or more terminals accepting entry of the user data for a process request;
   a database containing rules information that enable service of the court documents;
   a system controller operably connected to the network, the system controller configured to receive the user data and the court documents over the network, access the database to obtain the rules information, select a process server for carrying out service of the court based on the user data included in the process request and the rules information, and notify the selected process server automatically, so as to enable the process server to carry out service of the court documents.

2. The system of claim 1, wherein the user data includes at least a service jurisdiction and an entity being served.

3. The system of claim 1, wherein the one or more court documents are accessed via a papers database over the network.

4. The system of claim 1, wherein the one or more court documents are obtained from a third party system.

5. The system of claim 4, wherein the third party system is an electronic filing system.

6. The system of claim 1, wherein the service of the court documents is carried out by the selected process server.

7. The system of claim 6, wherein the selected process server transmits information to the system controller relating status or completion of the service of the court documents.

8. The system of claim 1, wherein the service of the court documents is carried out electronically.

9. The system of claim 1, wherein the selected process server is an email service provider.

10. The system of claim 1, wherein the service of the court documents is carried out in a manner specified in the user data.

11. The system of claim 1, wherein the system controller is configured to forward status notifications to one or more users.

12. A method for carrying out service of court documents, comprising the steps of:
   preparing a process request based on one or more court documents to be filed electronically or paper filed;
   providing a network for receiving user data for the process request, the network being accessible through one or more terminals;
   accepting entry of the user data through the network;
   accessing the one or more court documents through the network;
   receiving the user data and the court documents in a system controller, the system controller being operably connected to the network;
   accessing a database to obtain rules information that enable service of the court documents;
   selecting by the system controller a process server for carrying out service of the court documents based on the user data in the process request and the rules information;
   notifying the selected process server of the selection automatically by the system controller; and
   in response to the notifying step, carrying out service of the court documents by the notified process server.

13. The method of claim 12, further comprising the steps of:
   providing a papers database for storing the one or more court documents to be served; and
   accessing the court documents via the papers database over the network.

14. The method of claim 12, wherein the one or more court documents are obtained from an electronic filing system.

15. The method of claim 12, further comprising the steps of:
   generating a return of service document upon completion of the service of the court documents; and
   forwarding the return of service document to one or more users.

16. The method of claim 12, wherein the service of the court documents is carried out electronically.

17. The method of claim 12, wherein the selected process server is an email service provider.

18. The method of claim 12, wherein the service of the court documents is carried out in a manner specified in the user data.

* * * * *